United States Patent
Charles et al.

(10) Patent No.: US 6,478,541 B1
(45) Date of Patent: Nov. 12, 2002

(54) TAPERED/SEGMENTED FLAPS FOR ROTOR BLADE-VORTEX INTERACTION (BVI) NOISE AND VIBRATION REDUCTION

(75) Inventors: Bruce D. Charles, Mesa, AZ (US); Ahmed A. Hassan, Mesa, AZ (US); Hormoz Tadghighi, Scottsdale, AZ (US); Ram D. JanakiRam, Mesa, AZ (US)

(73) Assignee: The Boeing Company, St. Louis, MO (US)

(*) Notice: Subject to any disclaimer, the term of this patent is extended or adjusted under 35 U.S.C. 154(b) by 0 days.

(21) Appl. No.: 09/931,727

(22) Filed: Aug. 16, 2001

(51) Int. Cl.[7] .............................................. B64C 27/615
(52) U.S. Cl. ............................................................ 416/23
(58) Field of Search ............................ 416/23, 24, 228; 244/17.25

(56) References Cited

U.S. PATENT DOCUMENTS

| | | |
|---|---|---|
| 2,071,012 A | 2/1937 | Adams |
| 2,376,834 A | 5/1945 | Thompson |
| 2,397,132 A | 3/1946 | Dent, Jr. |
| 2,622,686 A * | 12/1952 | Chevreau et al. ............ 416/23 |
| 2,638,990 A | 5/1953 | Pitcairn |
| 2,689,541 A | 9/1954 | Williams |
| 2,716,460 A * | 8/1955 | Young ........................ 416/23 |
| 2,892,502 A | 6/1959 | Donovan |
| 3,262,658 A | 7/1966 | Reilly |
| 3,451,644 A | 6/1969 | Marchetti et al. |
| 3,509,971 A | 5/1970 | Gerstine et al. |
| 3,588,273 A | 6/1971 | Kizilos et al. |
| 3,612,444 A | 10/1971 | Girard |
| 3,713,750 A | 1/1973 | Williams |
| 3,820,628 A | 6/1974 | Hanson |
| 3,915,106 A | 10/1975 | DeWitt |
| 3,954,229 A | 5/1976 | Wilson |

(List continued on next page.)

FOREIGN PATENT DOCUMENTS

| | | |
|---|---|---|
| DE | 1801351 | 6/1969 |
| DE | 3129232 | 2/1983 |
| JP | 61-88699 | 5/1986 |
| RU | 1761973 | 9/1992 |

OTHER PUBLICATIONS

"Blade-Mounted Flap Control for BVI Noise Reduction Proof-of-Concept Test" by Dawson, Hassan, Straub, and Tadghighi; NASA CR 195078; Jul. 1995.

"Higher Harmonic Actuation of Trailing-Edge Flaps for Rotor BVI Noise Control" by Charles, Tadghighi, and Hassan; paper presented at the 52nd Annual forum of the American Helicopter Society; Jun. 1996.

"Acoustic Results from a Full-Scale Wind Tunnel Test Evaluating Individual Blade Control" by Swanson, Jacklin, Blaas, Niesel, and Kube; paper presented at the 51st Annual Forum of the American Helicopter Society; May 1995.

"Experimental Evaluation of Active and Passive Means of Alleviating Rotor Impulsive Noise in Descent Flight" by JanakiRam; NASA CR–159188; Nov. 1979.

(List continued on next page.)

*Primary Examiner*—Edward K. Look
*Assistant Examiner*—Ninh Nguyen
(74) *Attorney, Agent, or Firm*—Stout, Uxa, Buyan & Mullins, LLP; Donald E. Stout

(57) ABSTRACT

An active control device for reducing blade-vortex interactions (BVI) noise generated by a rotorcraft, such as a helicopter, comprises a segmented trailing edge flap located near the tip of each of the rotorcraft's rotor blades. The various flap segments may be independently actuated according to flap deflections schedules which are tailored to address a particular operating regime with maximum efficiency and effectiveness. Through the careful azimuth-dependent independent actuation of the flap segments, blade tip vortices which are the primary source for BVI noise are (a) made weaker and (b) pushed farther away from the rotor disk (that is, larger blade-vortex separation distances are achieved), resulting in lower BVI noise.

18 Claims, 3 Drawing Sheets

U.S. PATENT DOCUMENTS

| | | |
|---|---|---|
| 3,964,838 A | 6/1976 | Sprago |
| 4,040,578 A | 8/1977 | Yuan |
| 4,168,348 A | 9/1979 | Bhangu et al. |
| 4,169,567 A | 10/1979 | Tamura |
| 4,228,379 A | 10/1980 | Guscott et al. |
| 4,386,241 A | 5/1983 | Maeda |
| 4,514,143 A | 4/1985 | Campbell |
| 4,516,747 A | 5/1985 | Lurz |
| 4,534,702 A | 8/1985 | Johnson, Jr. et al. |
| 4,580,210 A | 4/1986 | Nordstrom |
| 4,706,902 A | 11/1987 | Destuynder et al. |
| 4,786,836 A | 11/1988 | Tokushima |
| 4,799,859 A | 1/1989 | Zimmer |
| 4,802,642 A | 2/1989 | Mangiarotty |
| 4,966,526 A | 10/1990 | Amelio et al. |
| 4,989,810 A | 2/1991 | Meier et al. |
| 5,320,491 A | 6/1994 | Coleman et al. |
| 5,387,083 A * | 2/1995 | Larson et al. ............. 416/23 |
| 5,437,419 A | 8/1995 | Schmitz |
| 5,457,630 A | 10/1995 | Palmer |
| 5,529,458 A | 6/1996 | Humpherson |
| 5,562,414 A | 10/1996 | Azuma |
| 5,747,906 A | 5/1998 | Tajima et al. |
| 5,804,906 A | 9/1998 | Tsutsumi |

OTHER PUBLICATIONS

"Effects of Surface Blowing/Suction on the Aerodynamic of Rotor Blade–Vortex Interactions—A Numerical Simulation" by Hassan, Straub, and Charles; Journal of the American Helicopter Society, vol. 42, No. 2; Apr. 1997.

"Comparative Measurements of the Unsteady Pressures and the Tip Vortex Parameters on Four Oscillating Wing Tip Models" by Wagner; paper presented at the Tenth European Rotorcraft Forum, paper No. 9, The Hauge, The Netherlands; Aug. 1984.

"Effect of an Anhedral Sweptback Tip on the Performance of a Helicopter Rotor"0 by Desopper, Lafon, and Prieur; paper presented at the Thirteenth European Rotorcraft Forum, paper No. 2.4, Arles France; Sep. 1987.

* cited by examiner

TAPERED/SEGMENTED FLAPS FOR ROTOR BLADE-VORTEX INTERACTION (BVI) NOISE AND VIBRATION REDUCTION

BACKGROUND OF THE INVENTION

This invention relates to rotor blades for rotorcraft such as helicopters and the like, and more particularly to an improved construction and control scheme for such rotor blades which permits a significant reduction in noise generated by the blades.

Conventional helicopters in low speed descent flight conditions frequently generate an impulsive noise signature which is commonly referred to as blade-vortex interactions (BVI) noise or "blade slap". BVI noise is generated by blade tip vortices, which interact with the rotor blades. Unfortunately, it is typically within a frequency range where human subjective response to noise is high, and because of its high harmonic levels in this frequency range, BVI noise has been identified as one of the most annoying, or objectionable, sounds produced by a helicopter. Consequently, a reduction in the BVI noise intensity and changes in the noise signature, using active and/or passive noise control techniques, is desirable to the rotorcraft industry, which is challenged by today's stringent military and civilian acoustic regulations.

Fundamentally, BVI noise is generated as a result of large temporal fluctuations in the blade aerodynamic loads due to close encounters with elements of the tip vortex wake. These unsteady loads are also known to result in an increase in the rotor vibration levels and the attendant decrease in the fatigue life of rotor dynamic components. An active control method that reduces the rotor vibration levels for all flight conditions is therefore highly desired.

Three vortex-related parameters are known to affect the intensity of BVI noise and rotor vibration levels. These parameters are:

a) tip vortex strength—this parameter is directly proportional to the magnitude of the induced aerodynamic loads. The intensity of BVI noise and rotor vibration levels are also directly related to the magnitude of the induced aerodynamic loads;

b) the intensity of BVI noise and rotor vibration levels are inversely proportional to the blade/vortex separation distance;

c) vortex orientation with respect to the blade—specifically whether the vortex is parallel (induces the largest temporal aerodynamic load variations), oblique, or perpendicular (not a concern for BVI noise but will have some impact on rotor vibration).

The objective in reducing BVI is to decrease the adverse effect of the interaction between the rotor blade and the tip vortices. Existing devices which have been used for reducing BVI noise include Higher Harmonic blade pitch control (HHC), which seeks to change the blade tip vortex strength, and thus the local aerodynamic conditions, through blade pitch changes. Other control means concentrate primarily on reducing the strength of the tip vortex through blade tip geometric modifications. Typical examples are the use of leading and trailing edge sweep, the use of blade anhedral, and the use of a subwing. All of these examples, excluding HHC, may be classified as passive control techniques. An example of another active control technique would be the use of tip air mass injection, which again has the purpose of weakening the blade tip vortices.

Each of the foregoing prior art solutions to BVI noise has been at least partially unsuccessful, either because of ineffectiveness or because of the solution's detrimental side effects with respect to the flight characteristics and efficiency of the rotorcraft. For example, HHC methods change the aerodynamic conditions along the entire blade in order to reduce BVI noise, due to the change in blade pitch. Passive BVI noise control methods are not adaptable to changing BVI conditions throughout the flight regime, which are associated with changes in aircraft descent rate and forward flight speed. Additionally, most of the prior art passive solutions to the BVI problem are deployed at all times, whether or not needed, often degrading flight performance unnecessarily.

More recently, the assignee of the present invention developed improved systems for reducing BVI noise, which are the subject of U.S. Pat. Nos. 5,588,800 (the '800 patent) and 5,711,651 (the '651 patent), herein expressly incorporated by reference. These patents disclose an active control device and system, comprising trailing edge flaps disposed near the tip of each of a rotorcraft's rotor blades. The flaps may be actuated in any conventional way (such as hydraulically, electrically, electromagnetically, pneumatically, etc.), and may be scheduled to be actuated to a deflected position during rotation of the rotor blade through predetermined regions of the rotor azimuth, and further scheduled to be actuated to a retracted position through remaining regions of the rotor azimuth. Through the careful azimuth-dependent deployment and retraction of the flap over the rotor disk, using scheduling principles developed by the patentees, blade tip vortices are a) made weaker, and b) pushed farther away from the rotor disk (so that larger blade-vortex separation distances are achieved).

The '800 and '651 patents, for example, disclose the use of one-piece, constant chord, integral-type trailing edge flaps, as well as multi-segment flaps. For a rigid model rotor, experiments have shown that a blade-mounted trailing edge flap can be used to alleviate rotor BVI noise and vibration levels using nonharmonic and harmonic flap schedules, respectively. For a full scale elastic blade, numerical studies have indicated reductions in BVI noise levels can be achieved by harmonic actuation of flaps causing increased blade/vortex separation distance in response to altering the blade spanwise pitch distribution and hence the aerodynamic loading. The use of Higher Harmonic root pitch control has also very similar effects to those obtained with the use of a trailing edge flap on an elastic blade. The use of Tip Air Mass Injection is an alternate example in which a high energy air jet is introduced at the tip of the blade and aimed towards the center, or the core, of the tip vortex with the intent of diffusing (or weakening) its strength. The use of continuous blowing/suction to control the unsteady aerodynamic response of a rotor blade during BVI were recently demonstrated numerically (and is the subject of U.S. Pat. No. 5,813,625).

Passive control systems, such as those based on varying the blade leading and trailing edge spanwise sweep angle distribution, blade anhedral, spoilers, and a subwing, attempt to impact one, two or three of the above mentioned factors that influence the intensity of BVI. A clear disadvantage of the use of passive control means, as contrasted to active control means, for the alleviation of rotor BVI noise and vibration reduction is their inability to adapt to other flight conditions. Consequently, once these features are permanently integrated into the design of a blade, rotor aerodynamic performance can deteriorate and noise and vibration levels can exceed the acceptable levels at conditions other than those representative of the design low-speed descent flight conditions.

SUMMARY OF THE INVENTION

This invention further refines and improves the innovative systems first taught in the aforementioned '800 and '651 patents.

More particularly, there is provided an active control device for reducing undesirable effects generated by a rotorcraft having a rotor blade including a tip end, a root end, a leading edge, and a trailing edge. As is conventional, the rotor blade is attached at its root end to a rotor hub on the rotorcraft, and extends radially outwardly therefrom, having a radius R and a chord C, such that when the rotor hub is rotatably driven, the rotor blade rotates about the hub through a 360 degree azimuth. The active control device comprises a movable flap comprised of a plurality of segments (preferably from two to four, though any number may be employed) which are each pivotally attached to the rotor blade trailing edge so that they each may be selectively independently deflected in both positive and negative directions (downwards and upwards, respectively, relative to the rotor blade surface). Advantageously, a radially outer one of the flap segments has a smaller chord length than a radially inner one of the flap segments. More specifically, the movable flap is tapered, such that each successive flap segment in a radially outward direction has a smaller chord length than an immediately preceding flap segment. In practice, this means that, of the aforementioned plurality of flap segments, a first radially innermost flap segment has a first chord length, and a second flap segment disposed radially outwardly of the first flap segment has a second chord length which is smaller than the first chord length. Furthermore, a third flap segment disposed radially outwardly of the second flap segment has a third chord length which is smaller than the second chord length. A fourth flap segment disposed radially outwardly of the third flap segment has a fourth chord length which is smaller than the third chord length.

The rotor blade may comprise a conventional helicopter rotor blade, or alternatively, a proprotor blade having a high degree of twist.

In another aspect of the invention, there is provided an active control device for reducing undesirable effects generated by a rotorcraft, which has a rotor blade including a tip end, a root end, a leading edge, and a trailing edge. The rotor blade is attached at the root end to a rotor hub on the rotorcraft and extends radially outwardly therefrom, having a radius R and a chord C, such that when the rotor hub is rotatably driven, the rotor blade rotates about the hub through a 360 degree azimuth. The active control device comprises a movable flap which is pivotally attached to the rotor blade trailing edge so that it may be selectively deflected in both positive and negative directions. The movable flap has a first chord length at a first radially inner location and a second chord length which is smaller than the first chord length at a second radial location which is outwardly of the first radial location. Preferably, the movable flap comprises a plurality of segments which are independently controllable to deflect individual ones of the segments in the aforementioned positive and negative directions.

In still another aspect of the invention, there is taught a unique method for reducing blade vortex-interaction (BVI) noise generated by a rotorcraft having a rotor blade including a tip end, a root end, a leading edge, and a trailing edge, wherein the rotor blade is attached at the root end to a rotor hub on the rotorcraft and extends radially outwardly therefrom, such that when the rotor hub is rotatably driven, the rotor blade rotates about the hub through a 360 degree azimuth, the rotor blade further comprising a movable flap comprising a plurality of independently controllable segments pivotally attached to the trailing edge, and arranged radially therealong. The method comprises the steps of actuating a first one of the plurality of flap segments to a first predetermined flap deflection angle at a particular predetermined rotor blade azimuth, and actuating a second one of the plurality of flap segments to a second predetermined flap deflection angle at the particular predetermined rotor blade azimuth. Advantageously, when the rotor blade azimuth is between a range of about 1 and about 115 degrees, both of the first and second flap deflection angles are positive, and the first flap deflection angle is greater than the second flap deflection angle. Furthermore, when the rotor blade azimuth is between a range of about 165 and about 310 degrees, both of the first and second flap deflection angles are negative, and the first flap deflection angle is greater than the second flap deflection angle. Preferably, the aforementioned first flap segment is disposed radially inwardly of the second flap segment, and has a larger chord length than the second flap segment. The respective flap segments may be deflected out-of-phase with one another, or in-phase relative to one another, as shown in FIGS. 2 and 3.

In yet another aspect of the invention, there is disclosed a method for reducing blade vortex-interaction (BVI) noise generated by a rotorcraft having a rotor blade including a tip end, a root end, a leading edge, and a trailing edge, wherein the rotor blade is attached at the root end to a rotor hub on the rotorcraft and extends radially outwardly therefrom, such that when the rotor hub is rotatably driven, the rotor blade rotates about the hub through a 360 degree azimuth. The rotor blade further comprises a movable flap comprising a plurality of independently controllable segments pivotally attached to the trailing edge, and arranged radially thereal-ong. The inventive method comprises the steps of deflecting one of the flap segments to a negative deflection angle and deflecting another of the flap segments to a positive deflection angle.

In still another aspect of the invention, there is disclosed a method for reducing blade vortex-interaction (BVI) noise generated by a rotorcraft having a rotor blade including a tip end, a root end, a leading edge, and a trailing edge, wherein the rotor blade is attached at the root end to a rotor hub on the rotorcraft and extends radially outwardly therefrom, such that when the rotor hub is rotatably driven, the rotor blade rotates about the hub through a 360 degree azimuth. The rotor blade further comprises a movable flap comprising a plurality of independently controllable segments pivotally attached to the trailing edge, and arranged radially thereal-ong. The method comprises the step of deflecting radially outer ones of the flap segments to desired flap deflection angles, and maintaining radially inner ones of the flap segments in a neutral (undeflected) orientation.

In another aspect of the invention, there is disclosed a method for reducing rotor blade vibration generated by a rotorcraft having a rotor blade including a tip end, a root end, a leading edge, and a trailing edge, wherein the rotor blade is attached at the root end to a rotor hub on the rotorcraft and extends radially outwardly therefrom, such that when the rotor hub is rotatably driven, the rotor blade rotates about the hub through a 360 degree azimuth. The rotor blade further comprises a movable flap comprising a plurality of independently controllable segments pivotally attached to the trailing edge, and arranged radially therealong. The inventive method comprises the step of deflecting radially inner ones of the flap segments to desired flap deflection angles, and maintaining radially outer ones of the flap segments in a neutral (undeflected) orientation.

DESCRIPTION OF THE PREFERRED EMBODIMENT

Figure 1:
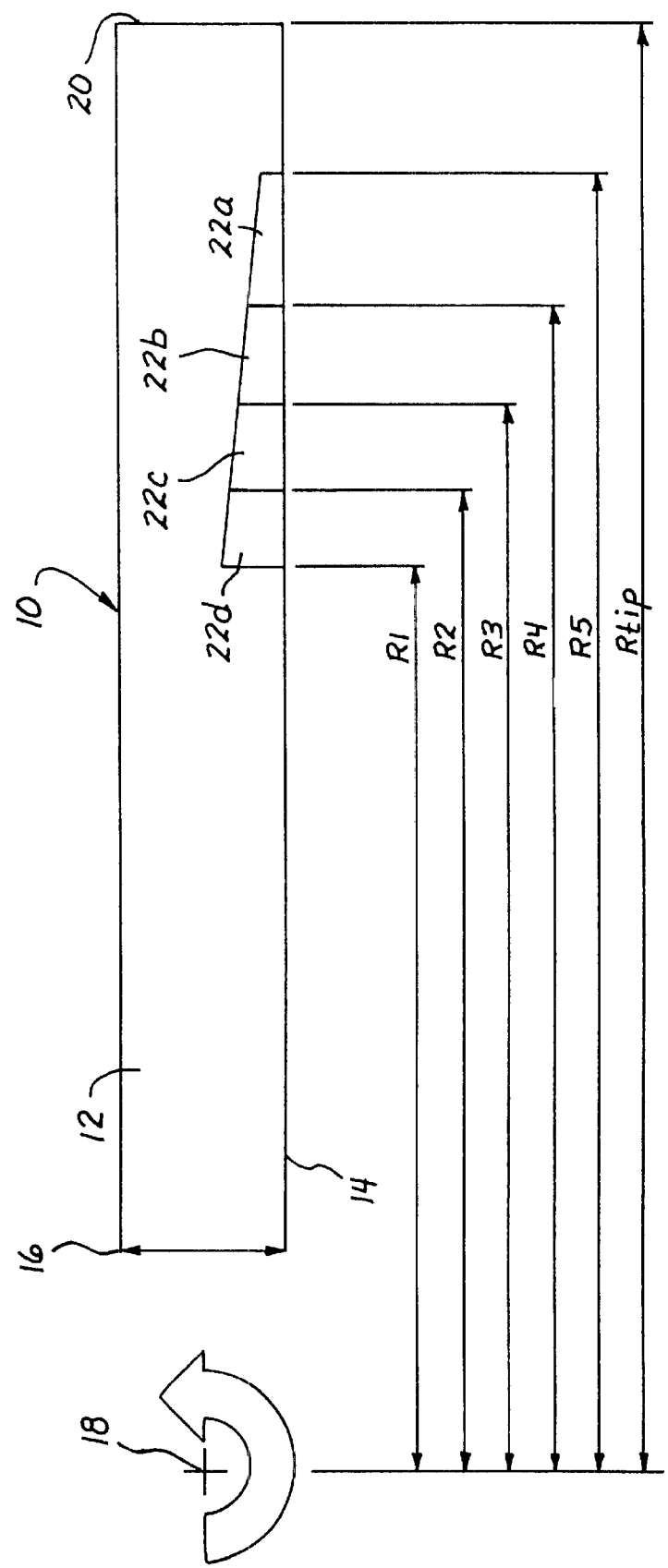
FIG. 1 is a schematic view of a preferred embodiment of a rotor blade for a rotorcraft, configured in accordance with the principles of the present invention, having a multi-segmented tapered trailing edge flap for providing active control of BVI noise.

The aerodynamic lift force, per unit span, acting on a rotor blade segment is equal to the product of the lift coefficient ($C_L$) times the local free stream dynamic pressure (Q) times the airfoil chord length (C), as follows:

$$\text{Lift force/unit span: } L = C_L * Q * C \tag{1}$$

Here, the dynamic pressure varies with the square of the local flow velocity (V) and the density of air ($\rho$), as follows:

$$\text{Dynamic pressure: } Q = 0.5 * \rho * V^2 \tag{2}$$

For a flapped airfoil, the lift coefficient is known to depend on the free stream angle-of-attack ($\alpha$), free stream Mach number (M), and the flap detection angle ($\delta$). For a rotor blade, the airfoil (basic element constituting the blade) speed is given by the product of the rotor angular velocity ($\omega$) times the radial distance (R) from the location of the airfoil to the rotor center of rotation, plus a component of the aircraft speed $V_a$ (which varies with blade azimuth ($\Psi$), as follows:

$$\text{Local airfoil speed: } V = \omega * R + V_a \sin(\Psi) \tag{3}$$

Expressions similar to that for the lift force can be written for the drag force (D) and the pitching moment ($M_p$), per unit span, acting on a segment of the blade:

$$\text{Drag force/unit span: } D = C_D * Q * C \tag{4}$$

$$\text{Pitching moment/unit span: } MP = CM * Q * C^2 \tag{5}$$

In Equations (4) and (5), $C_D$ is the local airfoil section drag coefficient and $C_M$ is the section moment about the quarter chord point of the airfoil.

Equations (1) through (5) indicate that the magnitude of the aerodynamic lift and drag forces, as well as the pitching moments acting along the span of a rotor blade, are a function of the blade radial position R. The effectiveness of the proposed tapered multi-segment flap is rooted in the ability to take advantage of this radial variation in the aerodynamic forces and moments which can be arbitrarily modified using a trailing edge flap. Specifically:

In contrast to a one-piece constant chord flap, a multi-segmented flap having a chord length that varies with blade radius provides the added advantage of tailoring the local blade aerodynamics across the various spanwise segments through proper combinations of flap chords and scheduled flap deflection angles. For example, for the inboard radial stations on the flap where the dynamic pressures are lower, a larger flap chord, in conjunction with a small deflection, can be used to maintain the same incremental aerodynamic forces typically obtained using a smaller flap chord in conjunction with larger deflections. This mitigates the high drag values associated with the larger flap deflections (despite the slight increase in drag due to the increase in flap chord length). The following illustration may clarify this principle. If a rotor blade with an untapered flap has two segments, the inboard segment must have a larger flap deflection angle than the outboard flap segment in order that the two segments have the same aerodynamic force increments per unit segment length. However, if the chord of the inner edge of the inboard segment is increased to produce a tapered flap, the inboard flap angle required to maintain equal unit length segment forces will be reduced relative to the untapered flap configuration. It should be noted, however, that even in the tapered configuration, the inboard flap angle required may still be larger than that of the outboard flap, to compensate for the increased dynamic pressure applied against the outboard flap.

If desired, one, two, three, . . . or all flap segments can be independently controlled using prescribed schedules (flap amplitudes and phases) to adapt to changes in the spanwise locations of the noise producing blade/vortex encounters at different flight speeds and descent rate conditions—hence the immediate benefits stemming from the application to a wide variety of flight conditions.

A multi-segmented flap (with each segment having a small aspect ratio AR) also minimizes mechanical control actuation difficulties that arise from blade spanwise bending at the flap hinge mounting points.

The multi-segmented flap can be employed for vibration reduction over a wide range of flight speeds by effectively varying the forces along the rotor span to meet the changing local flow. This can be accomplished by varying the number of segments on the flap, using different flap segment deflection angles, and/or through judiciously activating and deactivating particular flap segments to match the particular flight condition. For example, at higher speeds, fewer segments (especially those toward the tip of the blade) need to be activated.

Aerodynamic control strategies for vibration and BVI noise reduction can be simultaneously or independently met using the inventive multi-segmented flap (simultaneously as opposed to independently met is the preferred scenario). For example, for BVI noise reduction applications, the inboard flap segments can be left in their neutral position, while the outboard flap segments are activated. For vibration reduction applications, the inboard flap segments can be activated, while the outboard segments are kept in their neutral position.

A multi-segmented flap also permits additional control over the shape of the spanwise blade lift distribution, which is known to directly influence the behavior of the wake roll-up—hence its immediate impact on BVI noise through modification of the vortex strength and trajectory (miss distance).

A tapered multi-segmented flap offers aerodynamic performance benefits by reducing the magnitude of the drag forces associated with large flap deflections and/or large flap surface areas, particularly for span locations near the blade tip.

With the judicious use of the proposed multi-segmented tapered flap, lower rotor BVI noise levels can be obtained.

Lower BVI noise levels result in increasing community acceptance near heliports.

The segmented feature of the inventive flap allows for emulating various aerodynamic twist distributions across its spanwise extent. This feature can be used to improve the aerodynamic performance of the rotor in hover.

Passenger comfort, manifest in jet-like ride quality, on current helicopters and tiltrotor aircraft demands lower rotor vibration levels. This can be accomplished using the inventive multi-segmented tapered flap.

By reducing the rotor vibration levels, an increase in the fatigue life of the elements of the primary rotor control system will result. This translates into lower maintenance and lower direct operation costs.

The use of the multi-segmented flap results in lower control loads (as contrasted to those that result from the use of a one-piece constant chord flap) due to the lower inertial and aerodynamic loads on the actuated surfaces.

Referring now more particularly to FIG. 1, a rotor blade 10 for a rotorcraft, such as a helicopter, is illustrated schematically. The rotor blade 10 is constructed in conventional fashion, and includes a leading edge 12 and a trailing edge 14. The blade is attached at its root end 16 to a rotor hub (not shown) in a conventional fashion, so that when the rotor hub is rotationally driven by the rotorcraft engine (or, alternatively, when it is permitted to autorotate), the rotor blade 10 will rotate about the hub through a full rotor azimuth of 360 degrees. The blade center of rotation is illustrated schematically at 18. The blade also has a tip end 20 and a multi-segmented trailing edge flap 22. In the illustrated embodiment, the flap 22 comprises four segments 22a, 22b, 22c, and 22d, although any number of segments greater than one may be employed within the scope of the present invention, depending upon the control characteristics desired. In the preferred embodiment, each of the flap segments 22a, 22b, 22c, and 22d is independently operated using any conventional actuating means, including, for example, mechanical (such as cable-driven actuators), electromagnetic, electrical, pneumatic, or hydraulic actuation systems. The actuators may be driven either manually or automatically using flight control software.

The multi-segmented nature of the rotor blade 10 allows for independent flap motions along its span (R5–R1, as shown in FIG. 1). For example, in one particular operational configuration, segment 22d (FIG. 1), having a radial extent equal to (R2–R1), can be deflected downwards (i.e. positive deflection) by approximately 3 degrees, while segment 22a, having a radial extent equal to (R5–R4) can be deflected downwards by approximately 1 degree. An alternate scenario, for example, could be one where one or two of the segments 22a through 22d can be deflected downwardly, while the remaining segments can be deflected upwardly. In such a case, the resulting pitching moments across the span of the flap can mimic those that result from blade built-in step twist somewhere along the blade segment corresponding to the position of the flap (i.e. between R5 and R1).

Figure 2:
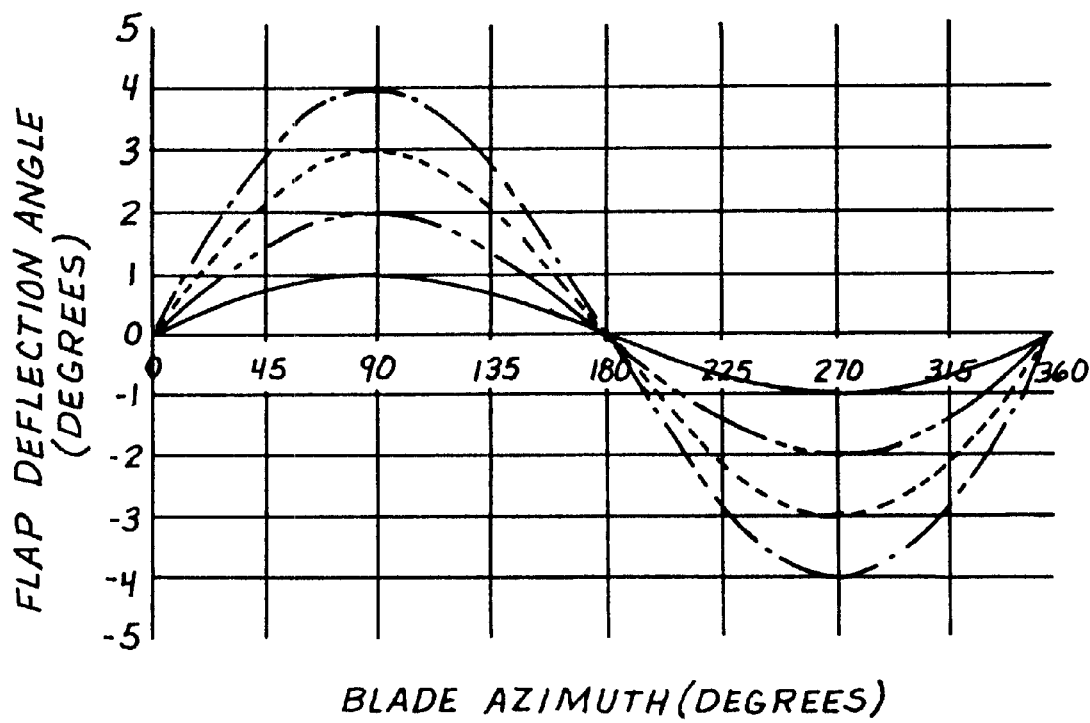
FIG. 2 is a schematic plot illustrating one preferred in-phase flap segment schedule prepared in accordance with the principles of the present invention, for obtaining effective BVI noise reduction.
Figure 3:
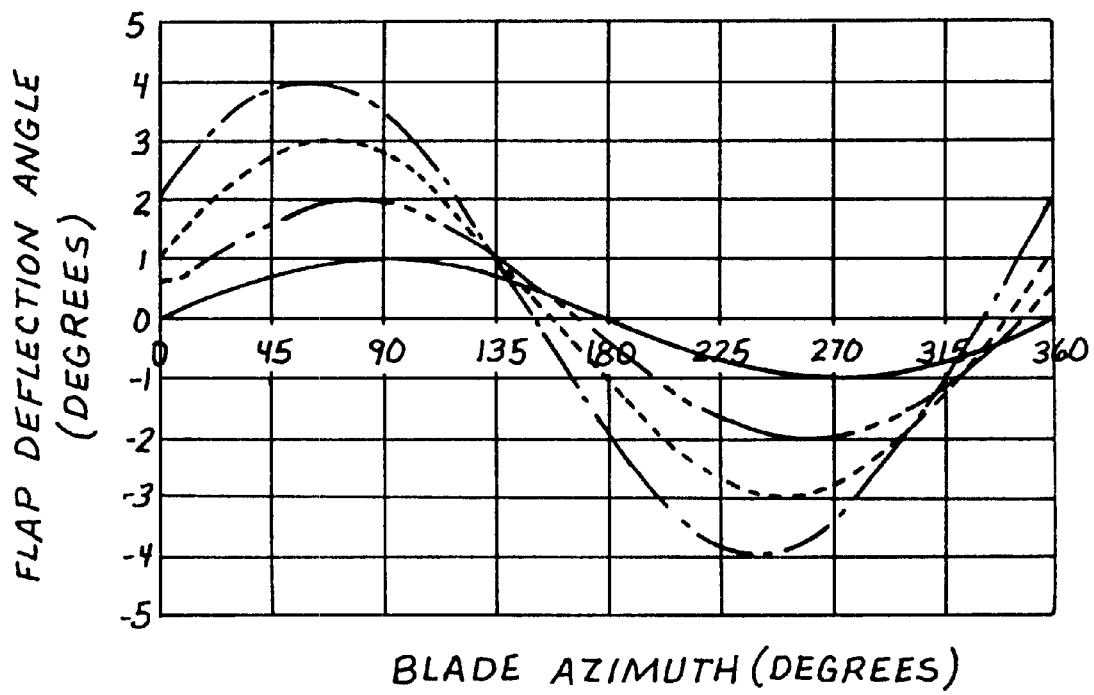
FIG. 3 is a schematic plot similar to FIG. 2 illustrating an alternative out-of-phase flap segment schedule prepared in accordance with the principles of the present invention.

The deflections corresponding to the various flap segments need not be constant as a function of blade azimuth. That is, the deflection of each segment can also vary in amplitude with blade azimuth, wherein 0 degrees azimuth is defined as the point where the tip of the rotor blade is oriented directly over the tailboom of the rotorcraft. When the same blade tip is oriented directly over the nose of the craft, the rotor azimuth is 180 degrees. FIGS. 2 and 3 depict plots of such azimuth-dependent deflections (or schedules) when using the same phase and different phases respectively.

In the preferred embodiment, as shown in FIG. 1, the flap 22 has a tapered chord dimension along its radial length, tapering in the radially outward direction, such that segment 22a has a substantially smaller chord dimension than segment 22d. In the preferred embodiment, the trailing edge flap 22 is positioned near the blade tip, in the outboard half of the rotor blade 10, constitutes approximately 20–40% of the rotor blade chord C, and spans approximately 20% of the blade radial length, or radius R. Thus, as illustrated in FIG. 1, the distance 24 between the leading edge 12 of the blade 10 and the flap hinge 26 of the flap 22 is preferably approximately 0.6C to 0.8 C. Similarly, the total radial length of the flap 22, in aggregate (all segments taken together), is preferably approximately 0.20R. It has been found that a significantly larger flap radial dimension engenders other undesirable flight effects.

In operation, as noted above, careful azimuth-dependent deployment and retraction of the flap segments 22a–d over the rotor disk are the key factors for achieving the maximum possible reductions in BVI noise and the maximum changes in the noise signature. BVI noise reduction is accomplished by reducing the strength of the blade tip vortices (which are the primary source for BVI noise) through significant variations in blade load distribution, as well as by changing the tip vortex trajectories to increase the average distance between the blade and the vortex elements causing the interactions. This is accomplished through variations in the tip path plane angle of the rotor.

For a given rotor, the optimum flap schedule is a function of the number of blades, forward flight speed, descent rate, flap chord length, and the geometric, and hence aerodynamic, characteristics of the airfoil(s) constituting the blades. As shown in FIGS. 2 and 3, for both the in-phase and out-of-phase situations, radially inward flap segment 5 (22d) in some operational environments may be deflected a greater amount in both the positive and negative angle directions than the radially outward flap segment 2 (22a), such that the flap segment 22d may be deflected within a range of about +4 degrees to about –4 degrees, while the flap segment 22a may be deflected within a range of about +1 degree to about –1 degree. Similarly, in sequence, intermediate flap segment 3 (22b) may be deflected between a range of about +2 degrees to about –2 degrees, while intermediate flap segment 4 (22c) may be deflected between a range of about +3 degrees to about –3 degrees.

The segmented trailing edge flap permits a more complex control scheme than a single integrated flap, and therefore has a broadened useful range of application. However, it should be noted that, occasionally, in the case of the segmented trailing edge flap, it may be desirable, for reasons of performance rather than BVI reduction, for the segments to not be directly adjacent to one another, and perhaps to locate the radially innermost segment near the root end of the blade.

Some of the advantages of the inventive active control device for reducing BVI noise caused by blade tip vortices are its ability to change the aerodynamic characteristics locally on the blade through suitable flap motions (or schedules), the ability to adapt the trailing edge flap deployment schedules to changing BVI conditions which are associated with changes in descent rate and forward flight speed (this is not possible with passive BVI control methods), and the fact that deployment of the trailing edge flap 22 results in favorable changes in both the tip vortex strength (makes it weaker), and the blade-vortex separation distances (makes them larger). Devices which modify only the strength of the tip vortex generally cannot alter the separation distances and vice-versa. An additional advantage includes the ability to only deflect the flap when necessary during BVI conditions, and then retract it when not needed.

Besides all of the above enumerated advantages, another significant advantage of the invention is its ability to be used for other purposes not related to BVI noise reduction. For example, the flap may be selectively deflected to provide lift augmentation during maneuvering flight, vibration control, rotor blade pitch control, aerodynamic/dynamic blade twist modifications, and modifications to rotor acoustic signature to emulate other types of rotorcraft, for covert military operations (an option certainly not available using passive noise control techniques) among other possibilities.

Tailoring the size and the deflection angle of each segment of the multi-segmented flap, depending upon its radial location on the blade, provides for more flexibility and extends its application to a wide variety of rotor configurations (such as the highly twisted proprotors currently used on tiltrotor aircraft such as the V-22).

Accordingly, although an exemplary embodiment of the invention has been shown and described, many changes, modifications, and substitutions may be made by one having ordinary skill in the art without departing from the spirit and scope of the invention.

What is claimed is:

1. An active control device for reducing undesirable effects generated by a rotorcraft having a rotor blade including a tip end, a root end, a leading edge, and a trailing edge, said rotor blade being attached at said root end to a rotor hub on said rotorcraft and extending radially outwardly therefrom, having a radius R and a chord C, such that when said rotor hub is rotatably driven, said rotor blade rotates about said hub through a 360 degree azimuth, said active control device comprising:

a movable flap comprised of a plurality of segments which are each pivotally attached to said rotor blade trailing edge so that they each may be selectively independently deflected in both positive and negative directions;

wherein a radially outer one of said flap segments has a smaller chord length than a radially inner one of said flap segments.

2. The active control device as recited in claim 1, wherein said movable flap is tapered, such that each successive flap segment in a radially outward direction has a smaller chord length than an immediately preceding flap segment.

3. The active control device as recited in claim 1, wherein said plurality of flap segments comprises at least two flap segments.

4. The active control device as recited in claim 1, wherein, of said plurality of flap segments, a first radially innermost flap segment has a first chord length, and a second flap segment disposed radially outwardly of said first flap segment has a second chord length which is smaller than said first chord length.

5. The active control device as recited in claim 4, wherein a third flap segment disposed radially outwardly of said second flap segment has a third chord length which is smaller than said second chord length.

6. The active control device as recited in claim 5, wherein a fourth flap segment disposed radially outwardly of said third flap segment has a fourth chord length which is smaller than said third chord length.

7. The active control device as recited in claim 1, wherein said rotor blade comprises a conventional helicopter rotor blade.

8. The active control device as recited in claim 1, wherein said rotor blade comprises a proprotor having a high degree of twist.

9. An active control device for reducing undesirable effects generated by a rotorcraft having a rotor blade including a tip end, a root end, a leading edge, and a trailing edge, said rotor blade being attached at the root end to a rotor hub on said rotorcraft and extending radially outwardly therefrom, having a radius R and a chord C, such that when said rotor hub is rotatably driven, said rotor blade rotates about said hub through a 360 degree azimuth, said active control device comprising:

a movable flap which is pivotally attached to said rotor blade trailing edge so that it may be selectively deflected in both positive and negative directions;

said movable flap having a first chord length at a first radially inner location and a second chord length which is smaller than said first chord length at a second radial location which is outwardly of said first radial location;

wherein said movable flap comprises a plurality of segments which are independently controllable to deflect individual ones of said segments in said positive and negative directions;

wherein a first one of said flap segments is disposed at said first radially inner location and a second one of said flap segments is disposed at said second radial location.

10. A method for reducing blade vortex-interaction (BVI) noise generated by a rotorcraft having a rotor blade including a tip end, a root end, a leading edge, and a trailing edge, wherein said rotor blade is attached at said root end to a rotor hub on said rotorcraft and extends radially outwardly therefrom, such that when said rotor hub is rotatably driven, said rotor blade rotates about said hub through a 360 degree azimuth, said rotor blade further comprising a movable flap comprising a plurality of independently controllable segments pivotally attached to said trailing edge, and arranged radially therealong, said method comprising the steps of:

a) actuating a first one of said plurality of flap segments to a first predetermined flap deflection angle at a particular predetermined rotor blade azimuth; and b) actuating a second one of said plurality of flap segments, to a second predetermined flap deflection angle at said particular predetermined rotor blade azimuth;

wherein when said rotor blade azimuth is between a range of about 1 and about 115 degrees, both of said first and second flap deflection angles are positive, and said first flap deflection angle is greater than said second flap deflection angle.

11. The method as recited in claim 10, and further wherein when said rotor blade azimuth is between a range of about 165 and about 310 degrees, both of said first and second flap deflection angles are negative, and said first flap deflection angle is greater than said second flap deflection angle.

12. The method as recited in claim 10, wherein said first flap segment is disposed radially inwardly of said second flap segment.

13. The method as recited in claim 12, wherein said first flap segment has a larger chord length than said second flap segment.

14. The method as recited in claim 10, wherein the flap segments are deflected out-of-phase with one another.

15. The method as recited in claim 10, wherein the flap segments are deflected in-phase with one another.

16. A method for reducing blade vortex-interaction (BVI) noise generated by a rotorcraft having a rotor blade including a tip end, a root end, a leading edge, and a trailing edge, wherein said rotor blade is attached at said root end to a rotor hub on said rotorcraft and extends radially outwardly therefrom, such that when said rotor hub is rotatably driven, said rotor blade rotates about said hub through a 360 degree azimuth, said rotor blade further comprising a movable flap comprising a plurality of independently controllable segments pivotally attached to said trailing edge, and arranged radially therealong, said method comprising the step of deflecting one of said flap segments to a negative deflection angle and deflecting another of said flap segments to a positive deflection angle.

17. A method for reducing blade vortex-interaction (BVI) noise generated by a rotorcraft having a rotor blade including a tip end, a root end, a leading edge, and a trailing edge, wherein said rotor blade is attached at said root end to a rotor hub on said rotorcraft and extends radially outwardly therefrom, such that when said rotor hub is rotatably driven, said rotor blade rotates about said hub through a 360 degree azimuth, said rotor blade further comprising a movable flap comprising a plurality of independently controllable segments pivotally attached to said trailing edge, and arranged radially therealong, said method comprising the step of deflecting radially outer ones of said flap segments to desired flap deflection angles, and maintaining radially inner ones of said flap segments in a neutral (undeflected) orientation.

18. A method for reducing rotor blade vibration generated by a rotorcraft having a rotor blade including a tip end, a root end, a leading edge, and a trailing edge, wherein said rotor blade is attached at said root end to a rotor hub on said rotorcraft and extends radially outwardly therefrom, such that when said rotor hub is rotatably driven, said rotor blade rotates about said hub through a 360 degree azimuth, said rotor blade further comprising a movable flap comprising a plurality of independently controllable segments pivotally attached to said trailing edge, and arranged radially therealong, said method comprising the step of deflecting radially inner ones of said flap segments to desired flap deflection angles, and maintaining radially outer ones of said flap segments in a neutral (undeflected) orientation.

* * * * *